VACUUM TAPE SCRAPER

Filed Jan. 21, 1963 3 Sheets-Sheet 1

INVENTOR
WALTER GYSLING
BY
Cushman, Darby & Cushman
ATTORNEYS

VACUUM TAPE SCRAPER
Filed Jan. 21, 1963 3 Sheets-Sheet 2
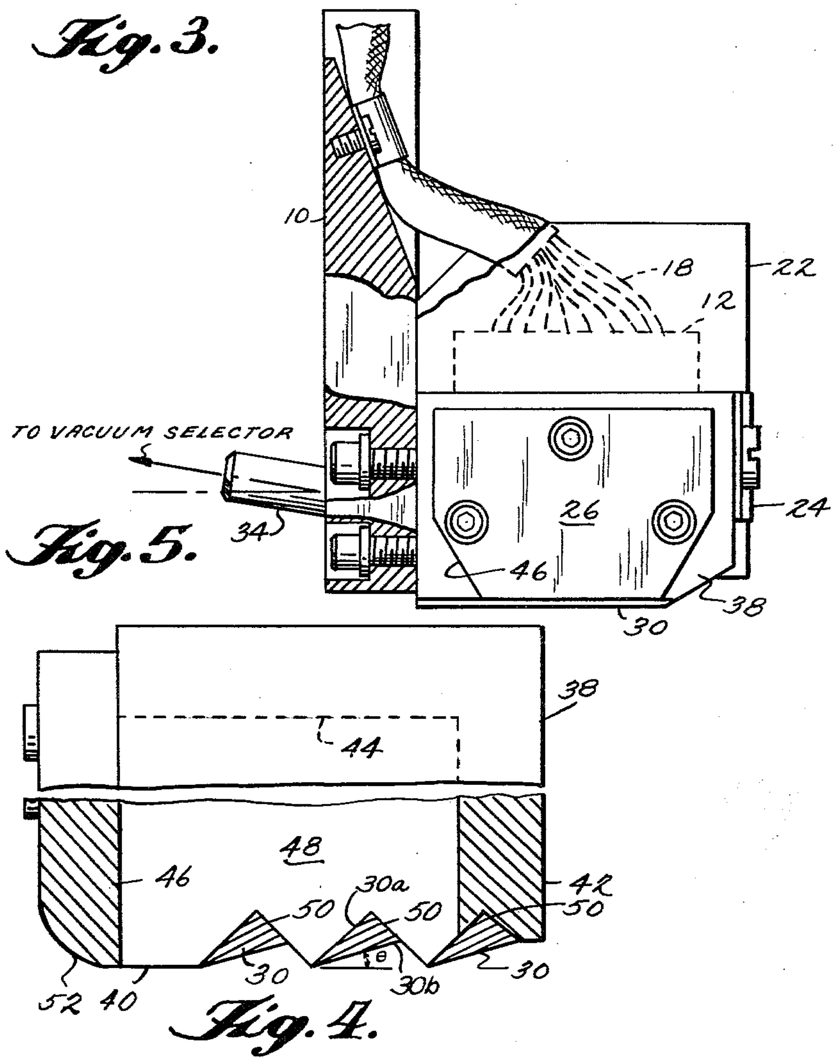
Fig. 3. Fig. 5. Fig. 4.
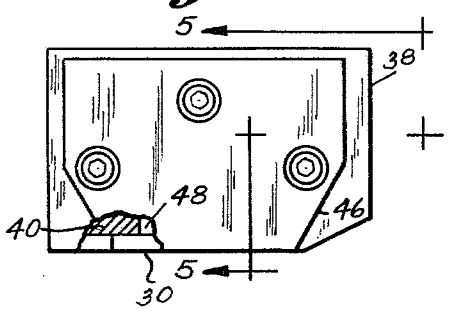
INVENTOR
WALTER GYSLING
BY
Cushman, Darby & Cushman
ATTORNEYS INVENTOR.
WALTER GYSLING
BY
Cushman, Darby & Cushman
ATTORNEYS 3,195,164

VACUUM TAPE SCRAPER

Walter Gysling, Minneapolis, Minn., assignor to Control Data Corporation, Minneapolis, Minn., a corporation of Minnesota Filed Jan. 21, 1963, Ser. No. 252,843
4 Claims. (Cl. 15—308)

This invention relates to a device for cleaning a recording tape and more particularly to a scraper provided with a vacuum system to draw the tape against the knife edges of the scraper to clean the tape as it moves past the scraper.

In recording or sensing information on a tape recording medium, it is important that the area on which the recording or sensing is performed be as clean as possible. This is particularly true in the field of data processing in which a number of bits of information are contained within a relatively small area of a magnetic recording tape.

Magnetic tapes commonly employed in data processing equipment utilize a ferric oxide recording surface. This surface tends to develop "oxide nodules" which contribute to inaccurate recording or sensing of information on the tape.

In addition, dirt or other imperfections on the tape may also result in improper recording or sensing.

It is a purpose of this invention to provide a tape cleaning device which conditions the recording surface of the tape by removing these defects in order to prepare the tape for a recording or sensing operation.

A further object of the invention is to provide a vacuum tape scraper arrangement associated with the recording and sensing devices.

Another purpose of the invention is to provide a tape cleaning device which is operative to clean the tape regardless of the direction of movement of the tape.

Further objects and the entire scope of the invention will become more fully apparent when considered in light of the following detailed description of an illustrative embodiment of this invention and from the appended claims.

The illustrative embodiment may best be understood by reference to the accompanying drawings wherein:

FIGURE 3 is a front elevation view of the magnetic head assembly shown in FIGURES 1 and 2 with the mounting arrangement shown partially in section;

FIGURE 4 is a front elevation view of the left hand scraper assembly;

FIGURE 5 is an enlarged view taken along line 5—5 of FIGURE 4;

Briefly, the invention relates to a scraper assembly in which a plurality of knife edges are supported by a housing to which a vacuum may selectively be applied. The knife edges extend entirely across a recording tape and are normaly spaced therefrom. The cutting surfaces of the knife edges are disposed at an acute angle to the direction of movement of the recording tape. When the tape is moved in a direction in which the knife edges present a "positive" cutting surface with respect thereto, a vacuum is applied to the scraper assembly to draw the recording surface against the cutting surfaces. The vacuum and the knife edges cooperate to clean the tape's recording surface. When the tape moves in the opposite direction, the vacuum is removed allowing the tape to assume its spaced relationship with respect to the knife edges thereby preventing the tape from encountering the "negative" cutting surface of the knife edges.

Figure 1:
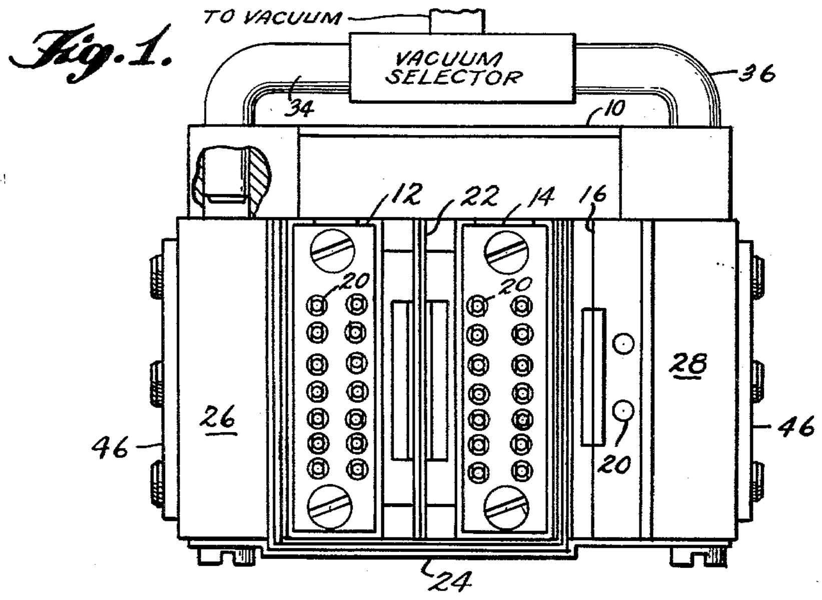
FIGURE 1 is a top plan view of a magnetic head assembly incorporating the inventive vacuum tape scraper, with a portion of the vacuum outlet being shown in section and the vacuum selector being shown diagrammatically.
Figure 2:
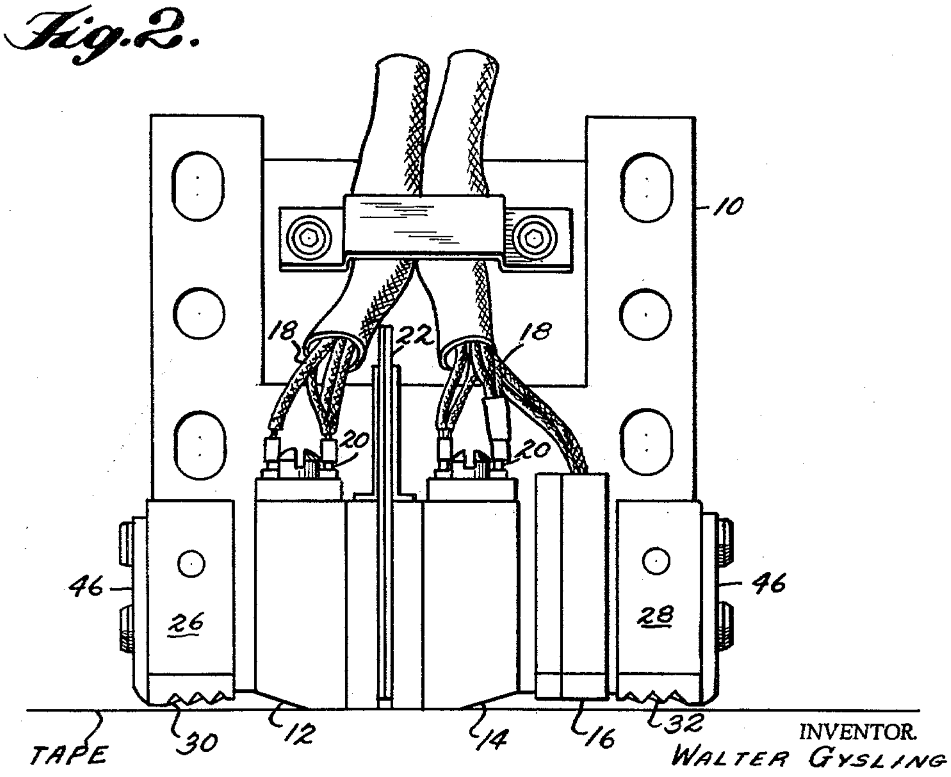
FIGURE 2 is a side elevation view of the magnetic head assembly shown in FIGURE 1, the front shield being removed for convenience of illustration.

An illustrative embodiment of an arrangement employing the inventive vacuum tape scraper is shown in FIGURES 1–3 in which the cleaning devices are disposed on opposite sides of a read-write head by which information may be sensed or recorded on a magnetic tape.

The magnetic head assembly of FIGURES 1–3 comprises a mounting plate 10 to which there is suitably attached a conventional transducer which includes a read head 12, a write head 14 and an erase head 16. The erase head and the separate channel elements of the read-write heads are appropriately connected to the remainder of the data processing equipment by means of conductors 18 attached to connectors 20. The read and write heads are shielded by the interhead shield 22 and the front shield 24. (In FIGURE 2 the front shield 24 has been removed for clarity.)

Also connected to the mounting plate 10 on opposite sides of the conventional transducer are a left hand scraper assembly 26 and a right hand scraper assembly 28. The details of the scraper assemblies will be described with reference to FIGURES 4 and 5. However, it may be seen in FIGURE 2 that the knife edges 30 and 32 of scraper assemblies 26 and 28 respectively, are disposed in opposite directions such that knife edges 30 present a "positive" cutting edge with respect to tape motion from left to right and a "negative" cutting edge when the tape moves from right to left. The opposite relationship exists for knife edges 32.

It should also be noted that cutting edges of scraper assemblies 26 and 28 lie in a plane generally parallel to that of bottom surfaces of the read-write heads 12 and 14, the latter plane extending outwardly from the plane of the cutting edges by a short distance.

Extending through mounting plate 10 and communicating at one end with the hollowed interiors of scraper assemblies 26 and 28 are vacuum outlet pipes 34 and 36. These outlet pipes are connected at their opposite ends to a vacuum selecting device shown diagrammatically in FIGURE 1. This selector may be of any well known type for selectively connecting either of outlet pipes 34, 36 to a vacuum source (not shown) by means of a suitable valve arrangement. It will be appreciated that the vacuum selector per se constitutes no part of the invention.

Referring to FIGURES 4 and 5 the scraper assembly structure may be described. For purposes of illustration only the left hand scraper assembly has been shown. However, it will be understood that the right hand scraper assembly is just opposite the structure illustrated.

The scraper assembly comprises a block shown generally at 38. The interior of this block is formed so as to provide side walls 40, a single end wall 42 and an upper portion 44 thereby defining a cavity within the block. Opposite the end wall 42 a cover plate 46 is attached to the block 38 to partially enclose the cavity leaving a hollowed area 48 therein into which air may pass through the open bottom of the block. Side walls 40 and end wall 42 are provided with spaced grooves 50 within which carbide knife edges are positioned and are attached to the block 38. It should be noted that the lower portions of side walls 40 extend beyond that of wall 42 and that groove 50 in end wall 42 allows its associated knife edge 30 to be mounted to the block along its length whereas the remaining knife edges are connected to block 38 only at their ends. The spacing of grooves 50 further allows air flow through the open bottom of block 38 to the hollowed interior 48.

The carbide knife edges 30 are mounted such that their cutting surfaces are directed towards the cover plate 46. These surfaces lie in the same plane as the bottom of the cover plate. The carbide knife edges 30 are defined by surfaces 30*a* and 30*b* formed so that when the edges 30 are positioned in grooves 50, surfaces 30*a* and 30*b* are at acute angles with respect to the direction of movement of the tape as it travels from cover plate 52 towards the respective knife edges 30. The knife edges thereby present "positive" cutting edges to the tape during movement thereof. By forming surface 30*b* in the manner described, its acute angle $\theta$ to the direction of tape movement defines a rake angle which insures that no "negative" cutting edges are presented to the moving tape to detrimentally affect the tape during its travel. The lower edge of the plate 46 is rounded at 52 to insure the smooth flow of tape along the lower portion of the cover plate.

As has been stated previously, the hollowed interior of the block 38 is suitably ported to communicate with the vacuum outlet 34.

Figure 6:
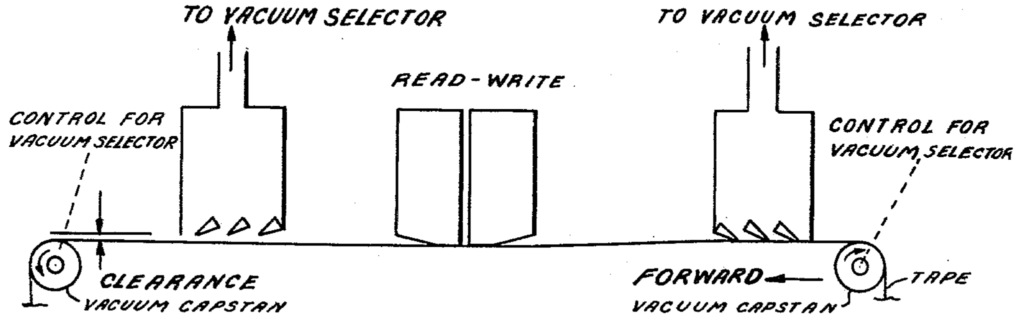
FIGURE 6 is a diagrammatic representation of the operation of the invention with the tape moving in a forward direction.
Figures 7, 8:
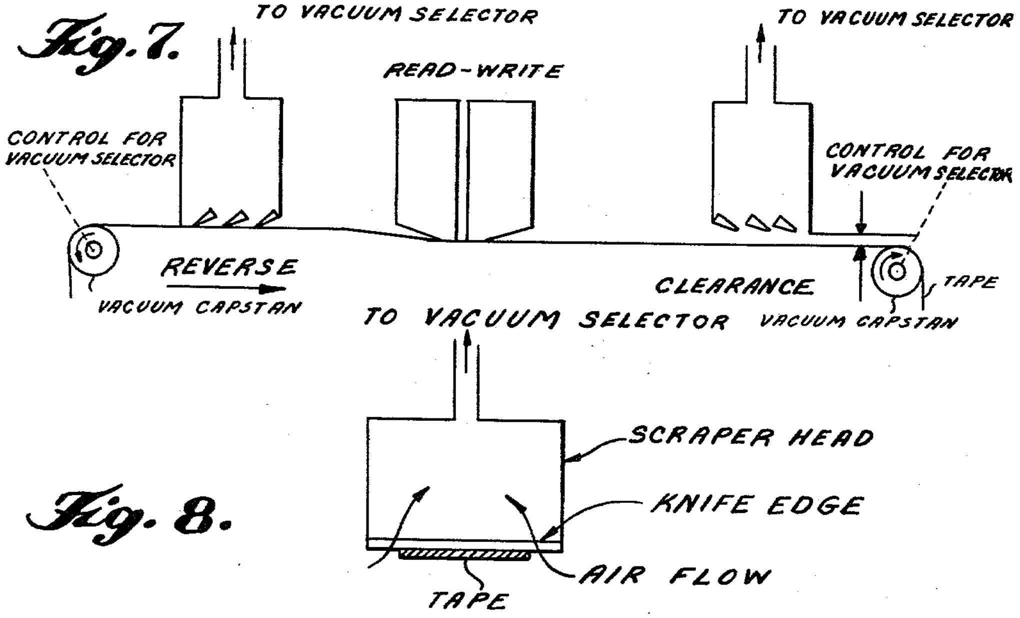
FIGURE 7 is a diagrammatic representation of the operation of the invention with the tape moving in a reverse direction.
FIGURE 8 is a diagrammatic representation of the relationship of the tape with the scraper head during cleaning.

Now that the structure of the illustrative embodiment has been set forth, the operation will be described with reference to the diagrammatic illustrations of FIGURES 6–8.

The tape is arranged to move beneath the tape scrapers and the read-write heads (the erase head being eliminated for convenience). In its arrested position the tape lies adjacent the read-write head and is spaced from the vacuum scraper heads (see FIGURE 2). The width of the tape is somewhat less than the length of the knife edges. The cutting edges are disposed at an acute angle with respect to the length of tape thereunder.

When the tape begins to move in a forward direction (designated as from right to left in FIGURE 6) the vacuum selection device responds to the direction of tape movement to apply a vacuum to the right tape scraper assembly. This draws the tape against the assembly allowing the positive cutting edges of the right scraper to remove oxide nodules on the tape as well as to cooperate with the vacuum system to flush away dirt or other imperfections from the recording surface of the tape by a vacuum cleaning action before the tape reaches the transducer. The air flow pattern of this operation is illustrated in FIGURE 8, the air passing around the edges of the tape and between the spaced knife edges into the hollowed interior of the scraper assembly.

During the forward movement of the tape, the vacuum system associated with the left tape scraper is inoperative so that the tape passes beneath this scraper without contacting the negative cutting edge of the left hand assembly.

When the tape is moved in the reverse direction, the opposite operation occurs. The vacuum selector applies a vacuum to the left tape scraper assembly and releases the right one thereby cleaning the tape before it reaches the read-write head.

In this discussion the vacuum selector has diagrammatically been illustrated as operating under the control of the application of a vacuum to the rotating vacuum capstans shown which are appropriately selected to drive the tape. This arrangement may be readily fabricated by adapting any well known system, such as that disclosed in Patent No. 2,778,634—Gams et al. However, this method of control was intended for purposes of illustration only and other suitable arrangements may also be employed.

It will also be understood that any other known, appropriate vacuum selection device may be utilized with the inventive vacuum tape scraper.

The above-described illustrative embodiment comprises a preferred embodiment of the invention. However, this illustration is not intended to limit the possibilities of insuring the features of cleaning a recording medium by a combined scraping and vacuum system. The vacuum tape scraper disclosed herein is an example of an arrangement in which the inventive features of this disclosure may be utilized, and it will become apparent to one skilled in the art that certain modifications may be made within the spirit of the invention as defined by the appended claims.

What is claimed is:

1. A vacuum tape scraper for cleaning dirt, nodules and other imperfections from a moving magnetic tape comprising a scraper housing having a hollowed interior and an open bottom, a knife edge attached to said housing at the open bottom thereof, said knife edge defined by surfaces at substantial acute angles with respect to the direction of movement of said tape to present only a positive cutting knife edge to the tape, and a vacuum outlet communicating with the hollowed interior of said scraper housing, said scraper being operative on the application of a vacuum to said vacuum outlet to draw the moving tape against said knife edge to thereby sever the nodules from the tape and to draw the dirt, severed nodules and other imperfections away from said tape.

2. A vacuum tape scraper as set forth in claim 1 further comprising additional spaced knife edges extending across the entire width of said tape.

3. A vacuum tape scraper arrangement for cleaning dirt, nodules and other imperfections from magnetic tape comprising a first vacuum tape scraper assembly positioned at a first location in the path of said tape, a second vacuum tape scraper assembly positioned at a second location in the path of said tape, said first and second scraper assemblies being aligned along the path of the tape movement; each of said first and second scraper assemblies comprising a scraper housing having a hollowed interior and an open bottom, a knife edge attached to said housing at the open bottom thereof, said knife edge defined by surfaces at substantial acute angles with respect to the direction of movement of said tape in contact therewith to present only a positive cutting knife edge to the tape, and a vacuum outlet communicating with the hollowed interior of said scraper housing; a vacuum selector connected to the vacuum outlet of each of said scraper assemblies and means responsive to the direction of movement of said tape to control said vacuum selector to thereby apply a vacuum to a selected one of said scraper assemblies to draw the moving tape into contact with its associated knife edge to thereby sever the nodules from the tape and to draw the dirt, severed nodules and other imperfections away from said tape.

4. A vacuum tape scraper as set forth in claim 3 further comprising additional spaced knife edges extending across the entire width of said tape.

References Cited by the Examiner

UNITED STATES PATENTS

| | | | |
|---|---|---|---|
| 2,262,724 | 11/41 | Hoffman | 15—310 |
| 2,313,935 | 3/43 | Glover | 15—310 |
| 2,404,873 | 7/46 | Winkley | 15—308 X |
| 2,634,221 | 4/53 | McAlpine et al. | 15—100 X |
| 2,778,634 | 1/57 | Gams et al. | |
| 2,984,398 | 5/61 | Chalmers | 226—97 X |
| 3,003,176 | 10/61 | Govette | 15—308 X |
| 3,035,295 | 5/62 | Buslik et al. | 15—308 X |
| 3,059,266 | 10/62 | Cleveland | 15—308 |
| 3,091,794 | 6/63 | Pillsbury | 15—308 |

WALTER A. SCHEEL, *Primary Examiner.*